(12) United States Patent
Ottavi (10) Patent No.: US 7,804,945 B2
(45) Date of Patent: Sep. 28, 2010

(54) ENTERPRISE APPLICATION BASED MULTI-BILLING INTEGRATION SYSTEM

(75) Inventor: Adriano Ottavi, San Mariano (IT)

(73) Assignee: Accenture Global Services GmbH, Schaffhausen (CH)

( * ) Notice: Subject to any disclaimer, the term of this patent is extended or adjusted under 35 U.S.C. 154(b) by 1337 days.

(21) Appl. No.: 11/290,696

(22) Filed: Nov. 30, 2005

(65) Prior Publication Data
US 2007/0121650 A1    May 31, 2007

(30) Foreign Application Priority Data
Aug. 31, 2005    (IT) .......................... MI2005A1619

(51) Int. Cl.
*H04M 15/00* (2006.01)
*H04M 17/00* (2006.01)
(52) U.S. Cl. ............. 379/114.03; 379/126; 379/144.06; 705/34
(58) Field of Classification Search ................. 379/111, 379/112.01, 114.01, 114.03, 115.01, 115.03, 379/121.01, 121.03, 126, 127.03; 705/14.01, 705/27, 34, 40; 713/184
See application file for complete search history.

(56) References Cited

U.S. PATENT DOCUMENTS

| | | | | |
|---|---|---|---|---|
| 6,741,685 B1 * | 5/2004 | Zanaty | ................... | 379/114.01 |
| 6,965,668 B2 * | 11/2005 | Clark et al. | .................. | 379/116 |
| 7,280,644 B2 * | 10/2007 | Tamari et al. | .......... | 379/114.16 |
| 7,386,295 B2 * | 6/2008 | Alloune et al. | .............. | 455/406 |
| 7,477,731 B2 * | 1/2009 | Tamari et al. | .......... | 379/114.16 |
| 7,522,716 B2 * | 4/2009 | Paschini | .................. | 379/93.12 |
| 7,526,130 B2 * | 4/2009 | Hayakawa et al. | .......... | 382/183 |
| 7,599,479 B2 * | 10/2009 | Maestas et al. | .............. | 379/119 |
| 7,620,162 B2 * | 11/2009 | Aaron et al. | ................. | 379/111 |
| 7,676,030 B2 * | 3/2010 | New et al. | ................. | 379/93.12 |
| 2003/0133552 A1 * | 7/2003 | Pillai et al. | ............... | 379/114.2 |
| 2004/0015366 A1 | 1/2004 | Wiseman et al. | | |
| 2004/0153404 A1 | 8/2004 | Rischmueller et al. | | |

FOREIGN PATENT DOCUMENTS

| EP | 1 052 841 A2 | 11/2000 |
|---|---|---|
| EP | 1 418 743 A1 | 5/2004 |
| WO | WO 03/025809 A2 | 3/2003 |

OTHER PUBLICATIONS

XP-002186385, IPDR, A View into the IPDR Organization, "Standards Effort Moves from Usage to Provisioning", TelOSSource Magazine, Apr. 2000, 6 pages.

* cited by examiner

*Primary Examiner*—Binh K Tieu
(74) *Attorney, Agent, or Firm*—Brinks Hofer Gilson & Lione (57) ABSTRACT

A telecommunications messaging architecture efficiently routes messages to the appropriate support systems which process the messages. The messaging architecture is a partially merged architecture in which selected previously independent processing systems (e.g., customer relationship management systems) have been merged. Despite the partially merged architecture, a routing system flexibly routes messages between the merged systems and the appropriate supporting systems. The supporting systems may multiple independent billing systems which have not been merged, for example.

20 Claims, 8 Drawing Sheets

ENTERPRISE APPLICATION BASED MULTI-BILLING INTEGRATION SYSTEM

PRIORITY CLAIM

This application claims the priority benefit of EPO Application No. 05425612.8 filed Aug. 31, 2005, and Italian Application No. MI2005A001619 filed Aug. 31, 2005, both of which are incorporated herein by reference in their entirety.

BACKGROUND OF THE INVENTION

1. Technical Field

This invention relates to telecommunications processing system architectures. In particular, this invention relates to supporting and integrating multiple support systems into a telecommunications system architecture for a service provider which is evolving toward a unified care management architecture.

2. Related Art

Rapid advances in data processing and telecommunications technology have lead to a vast array of communication services available to the consumer. Such telecommunication services include traditional telephone service, Internet service, cable television service, cellular phone service, paging service, combined voice and data delivery service, and many other services. Furthermore, many services may be either wireless or wireline based.

The advances in technology, though rapid, did occur over time. As a result, many telecommunications services providers began with telecommunications system architectures directly supporting a small subset of the services now available today. The early architectures were specific to individual services, such as wireline telephone services. Furthermore, the architectures commonly employed service specific billing systems, such as billing systems tailored for wireline telephone billing.

As new telecommunications services emerged, service providers added independent processing systems to their architectures to support the additional services. For example, a service provider might independently implement and maintain a billing system for wireline customers as well as a billing system for wireless customers, or a billing system for residential customers and another billing system for business customers. Mergers and acquisitions between service providers (e.g., a wireless company merging with a wireline company) also resulted in a service provider independently running multiple discrete architectures.

Beyond billing systems, each architecture also included other dedicated supporting systems, such as customer care systems. The customer care systems were responsible for communicating and receiving messages to and from the billing systems, such as messages which established new customers. In other words, as they began to offer more products and services, telecommunications service providers were faced with the time consuming, expensive, and difficult task of installing, maintaining, and upgrading multiple independent systems in multiple independent architectures.

Enhancing legacy architectures poses significant technical challenges, however. One such challenge is determining where and how to merge the multiple independent systems into a unified architecture. Given the cost and complexity of the systems, the architectures were generally only amenable to gradual merging of systems over time, rather than a rapid, complete merger. However, partially merged architectures lead to additional difficult technical challenges. For example, given a partially merged system, messages must still flow between the billing or other support systems and the remainder of the architecture in the correct manner. In addition, the correct message flow needs to be accomplished in an efficient manner with minimal disruption and reconfiguration of systems in the architecture.

SUMMARY

One aspect of the invention is a telecommunications messaging architecture. The architecture efficiently routes messages to the appropriate support systems without disruption or extensive reconfiguration of the systems within the architecture. Accordingly, even though the architecture may include one or more merged systems (e.g., a customer care system created by merging multiple legacy customer care systems), the architecture continues to efficiently route messages between the merged systems and the appropriate supporting systems which may be dedicated to processing specific types of requests for specific types of customers.

In one implementation, a telecommunications messaging architecture includes multiple support systems and a merged customer management system. Each of the support systems includes support processing logic adapted to process a specific type of message (e.g., a billing message) and/or messages for a specific type of customer (e.g., a wireless customer). The merged customer care management system maintains a customer database in which customer records from multiple, previously independent, customer care management systems reside.

More specifically, the customer database may store customer records which include an organization code stored in an organization field. In ordinary operation, the customer database employs the organization code to distinguish the customer records between multiple types of customers. For example, the customer database may distinguish the records based on the organization code into wireless and wireline customers.

The customer care system creates support messages which will initiate execution of processing actions in the support systems. For example, the support messages may include customer account creation, billing inquiry, or other messages.

In addition, the customer care management system adds routing fields to the messages. In particular, the customer care management system adds the organization code from the customer database into the message. The organization code is retrieved from the customer record in the customer database corresponding to the customer for whom the requested processing action specified in the outbound message will execute.

The architecture also includes a message routing system in communication between the customer care management system and the support systems. The message routing system receives the support message and extracts the organization code. The message routing system determines, based on the organization code, which of the multiple independent support systems is the appropriate system to execute the requested processing action. The message routing system routes the message to the determined support system.

As a result, the organization code executes a dual role. In one role, the organization code distinguishes the customer records in the customer database. As noted above, the organization code may distinguish between wireless or wireline customers in the customer database. In its second role, the same organization code functions as routing information. The routing system is configured to interpret the organization code as an indicator of where the message should be routed. Thus, the architecture routes messages to the appropriate support systems without increasing the complexity of the customer care database (e.g., to add a dedicated routing field) and without requiring changes to the data model in the customer care database.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

DETAILED DESCRIPTION OF THE PREFERRED EMBODIMENTS

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of systems and methods consistent with the multiple billing system integration architecture may be stored on, distributed across, or read from other machine-readable media, for example, secondary storage devices such as hard disks, floppy disks, and CD-ROMs; a signal received from a network; or other forms of ROM or RAM either currently known or later developed.

Furthermore, although specific components of the communications architecture will be described, methods, systems, and articles of manufacture consistent with the multiple billing system integration architecture may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, and other data structures may be separately stored and managed, may be incorporated into a single memory or database, may be distributed, or may be logically and physically organized in many different ways. Programs may be parts of a single program, separate programs, or distributed across several memories and processors. Systems may be implemented in hardware, software, or a combination of hardware and software in one processing system or distributed across multiple processing systems.

Figure 1:
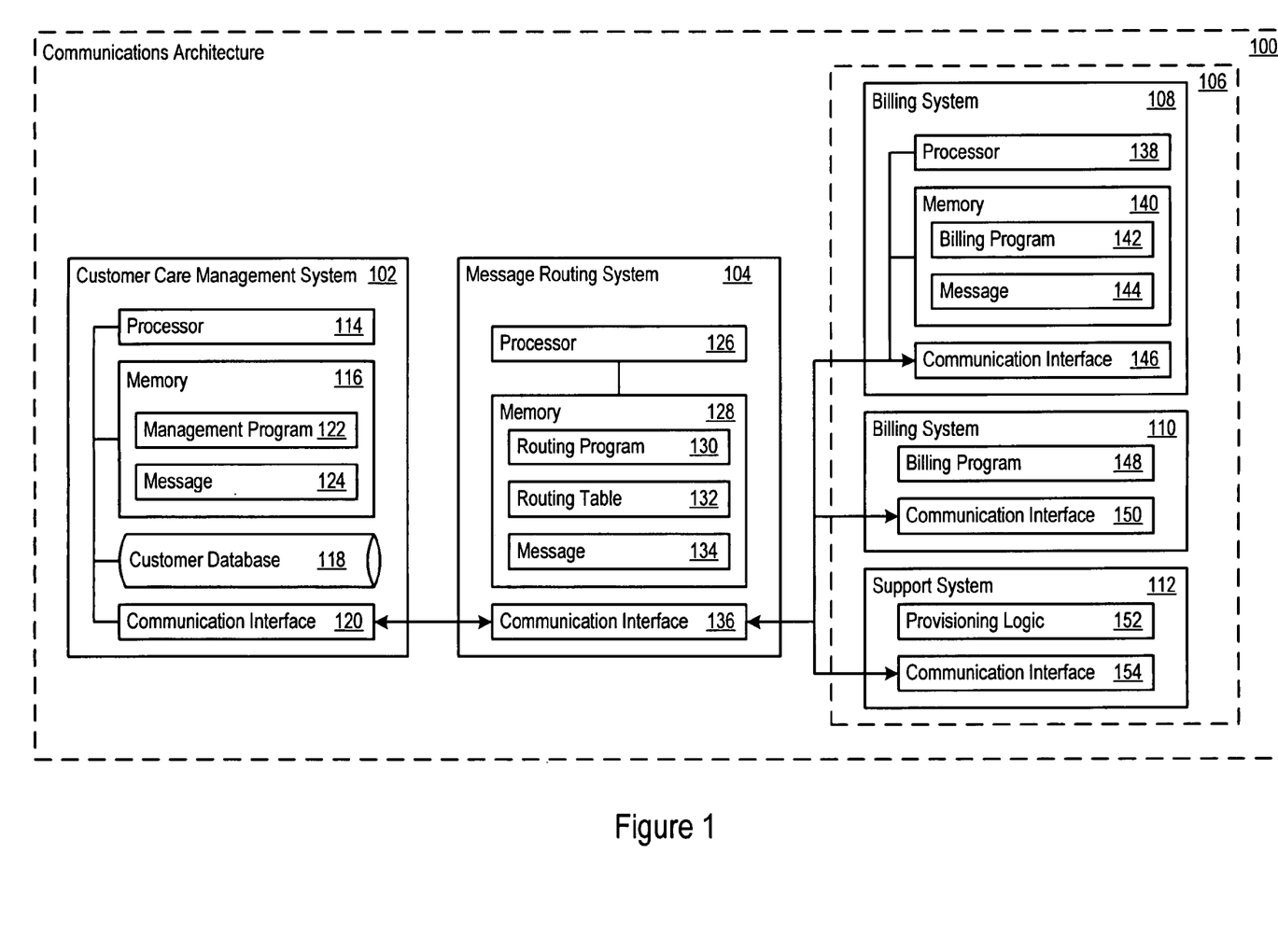
FIG. 1 shows a telecommunications messaging architecture.

FIG. 1 shows a telecommunications messaging architecture 100. The architecture 100 includes a Customer Care management system 102, a message routing system 104, and support systems 106. As shown in FIG. 1, the support systems 106 include a first billing system 108, a second billing system 110, and a provisioning system 112. The support systems 106 may fulfill a wide range of roles within the architecture 100, such as billing, provisioning, and invoicing, and other support roles performed by back-end systems in any industry such as the telecommunications industry, utility (e.g., gas or electric) industry, commercial industry, or any other industry.

The customer care management system 102 includes a processor 114, a memory 116, and a customer database 118. The customer care management system 102 also includes a communication interface 120. A customer care management program 122 in the memory 116 prepares messages 124.

In one implementation, the processor 114 in the customer care management system 102 executes Siebel™ 7.7 CME and Siebel™ Server under the Windows™ operating system, the UNIX operating system, the SUN Solaris™ operating system, or any other operating system. Additionally, an Oracle™ or Microsoft™ SQL server platform may implement the customer database 118. However, additional or different customer care management programs may be implemented in the customer care management system 102.

The customer care management system 102 communicates the messages 124 through the communication interface 120 to the message routing system 104. The message routing system 104 also includes a processor 126 and a memory 128. The memory 128 in the message routing system 104 stores a routing program 130, a routing table 132, and the messages 134 received from the customer care management system 102.

As shown in FIG. 1, the message routing system 104 is implemented as an independent processing system. However, the message routing system 104 may be implemented in other matters. For example, the message routing system 104 may be implemented as hardware and/or software integrated with the customer care management system 102, or other systems in the communications architecture 100. As another example, the message routing system 104 may be implemented as an extension to a messaging protocol processing layer (e.g., a message adaptation layer or message transport layer) within or external to the customer care management system 102.

As will be explained in more detail below, the message routing system 104 routes the messages 134 to the support systems 106 through the message routing system communication interface 136. More specifically, the message routing system 104 determines which support system 106 is the appropriate recipient for any given message 134. The appropriate support system 106 may then execute the appropriate processing action requested by the message.

The support systems 106 include the billing systems 108 and 110. FIG. 1 shows that the billing system 108 includes a processor 138, a memory 140, and a communication interface 146. The memory 140 stores a billing program 142 as well as messages 144 which the billing system 108 receives from the message routing system 104 through the billing system communication interface 146. In other words, the billing system 108 includes hardware and software support logic which processes billing action requests. The support logic in the billing system 108 may be implemented with commercially available billing software packages, such as Portal's Infranet™ billing package, Convergys Geneva™ billing package, Intec Singl.eView™, GSG Kenan FX™ billing package as well as with custom billing software.

The support systems 106 may implement a wide range of functionality for the telecommunications architecture 100. Generally, each support system 106 includes a communication interface for receiving the messages, as well as the logic which supports the function accomplished by the support system 106. The support systems 106 may include any number of support systems with the same or similar functions.

FIG. 1 shows a second billing system 110 which also includes a billing program 148. Like the first billing system 108, the second billing system 110 processes messages received through the service order system communication interface 150. The second billing system 110 may process billing actions for different types of customers or accounts than the first billing system 108, for example. As another example, FIG. 1 shows the support system 112 configured as a provisioning system 112. The provisioning system 112 includes the provisioning logic 152 which processes messages received through the provisioning system communication interface 154. The provisioning system 112 may initiate hardware and/or software set up, component ordering, and/or configuration of services (e.g., cable television) for customer.

In some implementations, the support systems 106 include not only the billing system 108, but also additional independent billing systems such as the billing system 110. For example, when one company acquires a second company, each company's legacy billing systems may survive the acquisition and may be present in the architecture 100. In other scenarios, one company adds additional products or services which are then made available to customers. Accordingly, the architecture 100 may include multiple independent billing systems which support one or more of the new and existing products and services.

On the other hand, the customer care management system 102 may be a merged customer care management system. In other words, the customer care management system 102 may represent a merger of customer data from multiple previously independent customer care management systems. The multiple customer care management systems may have been in place to support customers subscribing to any number of telecommunications products and services. For example, one customer care management system may have managed wireless customers, while a second customer care management system may have managed wireline customers.

Communication between the customer care management system 102, the message routing system 104, and the support systems 106 may be accomplished in many ways. In some implementations, the communication interfaces 120, 136, 146, 150, and 154 may be network sockets defined by IP addresses, port numbers, and communication protocols. The messages may travel between the systems 102, 104, and 106 according to a wide range of protocols, including Tibco™ Rendezvous Messaging protocol, IBM MQseries™ protocol, Java Message Service protocol, or HTTP. In other implementations, the systems 102, 104, and 106 communicate via interprocess communication, messaging, or signaling.

The architecture 100 may incorporate message passing and any application integration technologies such as TIBCO Business Work™ messaging, BizTalk™ messaging, BEA WLI™ and Vitria™ telecommunications solutions. Adapters may be provided between the customer care management system 102 and the message routing system 104, as well as between the message routing system 104 and the support systems 106. The adapters may support transformation of the messages and/or message content from a format defined by one schema (e.g., a schema for messages to adhere to in the customer care management system 102) to another format defined by another schema (e.g., a schema for messages to adhere to in the message routing system 104 and/or support systems 106).

In one implementation, the messages 124, 134, and/or 144 contain data described by eXtensible Markup Language (XML) messages and the adapters perform transformation according to eXtensible Stylesheet Language for Transformations (XSLT) stylesheets. The transformations may transform data between schemas for any of XML, Web Service Definition Language (WSDL), eXtensible Scheme Diagram (XSD), as examples. The messages may move between systems using any king of transportation or data access protocol, including HTTP, Simple Object Access Protocol (SOAP), or other protocols in place at the customer care management system 102, message routing system 104, and/or support systems 106. Accordingly, it is not necessary that the outbound messages 124 in the customer care management system 102 have the same form or content as the outbound messages 134 received by the message routing system 104. Similarly, the outbound messages 134 need not have the same form or content as the outbound messages received by the support systems 106, such as the outbound messages 144.

Figure 2:
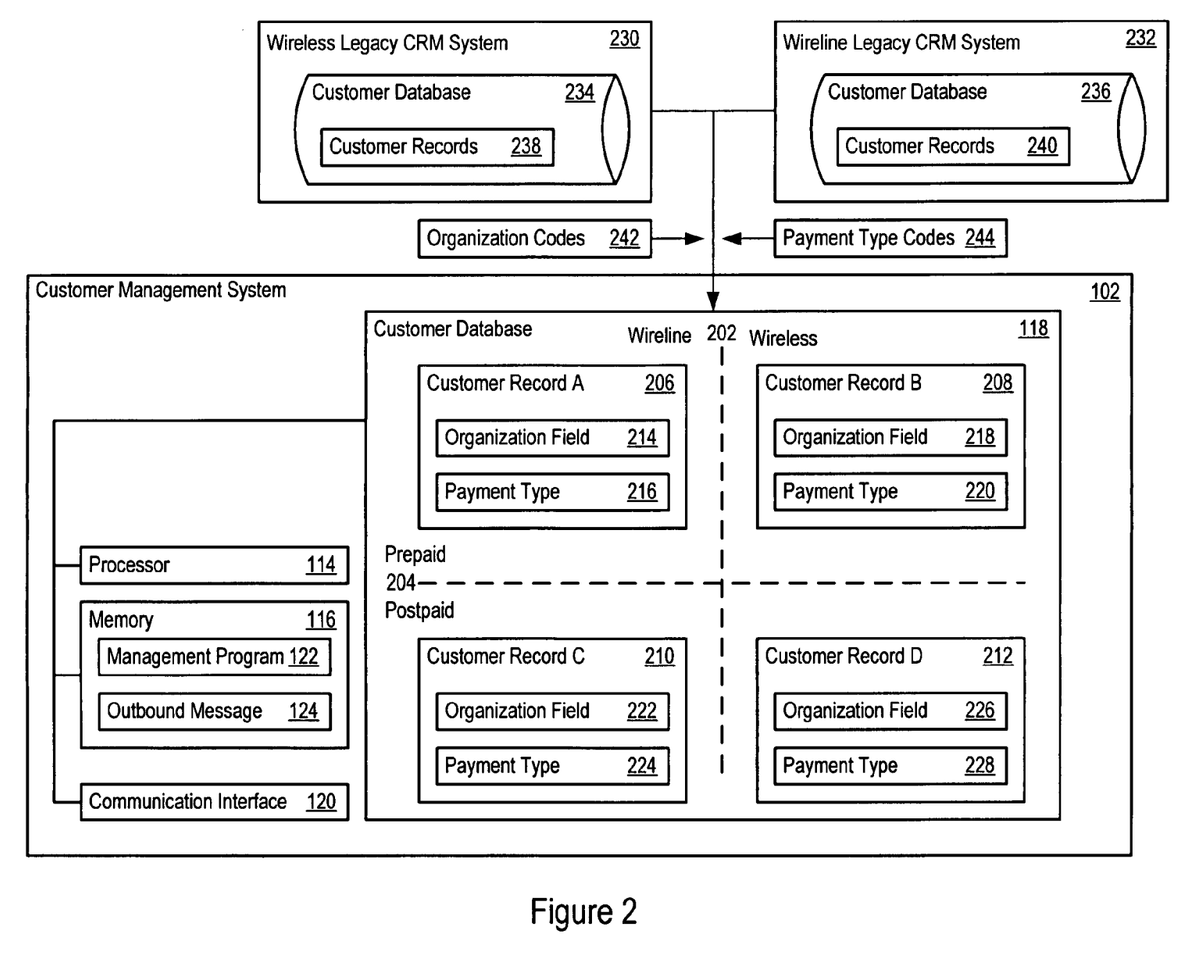
FIG. 2 shows a customer care management system that may be used in the telecommunications architecture shown in FIG. 1.

FIG. 2 shows a detailed view of the customer care management system 102. In particular, FIG. 2 shows the customer database 118, including multiple customer records: customer record A 206, customer record B 208, customer record C 210, and customer record D 212. Each customer record 206-212 may include one or more linked tables which include fields establishing and defining information for specific customers, such as customer name, address, payment type, contact information, and other customer data.

The customer records 206-212 shows two data fields in particular. The first field is an organization field 214. The organization field 214 may store an organization code (e.g., a predefined bit pattern) which indicates an organization to which the customer belongs. For example, the organization code may represent the origin of each customer when the customer records 206-212 were merged from previously independent customer relationship management systems. Alternatively, the organization code may distinguish the customers based on other customer characteristics.

The second field is a payment type field 216. The payment type field 216 may store a payment code which represents the manner in which the customer pays for the products and services provided by the telecommunications service provider. As examples, the payment code may indicate that a customer is a prepaid customer, a postpaid customer, or employs any other payment mechanism.

The customer database 118 is pre-designed to provide the organization field and payment type field (as well as other supplemental fields). Thus, each customer record 206-212 includes the organization field, payment type field, and other supplemental fields. As shown in FIG. 2, the customer record B 208 includes an organization field 218 and the payment type field 220. Similarly the customer record C 210 includes the organization field 222 and the payment type field 224, while the customer record D 212 includes the organization field 226 and the payment type field 228.

The data fields defined in the structure of the customer database 118 provide a natural mechanism for distinguishing between customers. In the example shown in FIG. 2, the data fields segment the customer database 118 along two dimensions. Along one dimension 202, customers are segmented between wireless and wireline customer types. Along the second dimension 204 the customers are segmented between prepaid and postpaid customers. In other implementations, the customer database may be segmented along any other dimensions according to any other customer characteristic represented by supplemental data stored in other fields in the customer database 118.

As a specific example, common organization codes stored in the organization fields 214-226 may be used to segment, view, or organize the customers between wireless and wireline customers. Similarly, a common payment type code stored in the payment type fields may be used to segment, view, or organize the customers between prepaid and postpaid customers. In FIG. 2, the customers associated with the customer record A 206 and the customer record B 208 share a common payment type code for prepaid payment but different organization codes distinguishing between wireline and wireless customers. Similarly, the customers associated with the customer record B 208 and the customer record D 212 share a common organization code for wireless customers but have different payment type codes which distinguish between prepaid and postpaid customers.

FIG. 2 also shows that the customer database 118 is a merged database. In particular, the customer records in the customer database 118 originate and are gathered from the legacy customer relationship management systems 230 and 232. The legacy customer relationship management systems 230 and 232 may be customer systems in place prior to a merger or acquisition, may represent previously implemented independent customer care systems for different products or services, or may represent other types of independent customer care management systems.

Each legacy customer relationship management system 230-232 includes a legacy customer database 234, 236 and legacy customer records 238, 240. In order to prepare the customer database 118 for operation in the communications architecture 100, the legacy customer records 238, 240 are merged into the customer database 118. The customer database 118 schema establishes the organization field and payment type field for each record in the customer database 118. Accordingly, as the legacy customer records 238, 240 are merged into the customer database 118, the communications architecture 100 adds the organization codes 242, payment type codes 244, and/or other supplemental codes into the corresponding customer records in the customer database 118. The organization codes 242, payment type codes 244, and/or other supplemental codes may be pre-determined to represent the legacy systems being merged, may be copied from the legacy customer records, or may be established or determined in other manners.

As one example, the customer relationship management system 230 may have been established in the past to perform customer care management for wireless customers. Similarly, the customer relationship management system 232 may have been established in the past to perform customer care management for wireline customers. Accordingly, as the data from the legacy customer records 238 is entered into a new customer record in the customer database 118, the customer care management system 102 sets a wireless organization code in the organization field of the new customer records. Similarly, as the data from the legacy customer records 240 is entered into the customer database 118, the customer care management system 102 sets a payment type code in the payment type field of the new customer records.

In legacy architectures, the legacy customer care management systems 230 and 232 may have interacted with independent support systems such as billing systems. Accordingly, after the customer records 238, 240 are merged into the customer database 118, the communications architecture 100 supports the continued presence of the independent support systems by efficiently routing billing messages to the appropriate billing systems. As will be described in more detail below, the message routing system 104 leverages existing database fields in the customer database 118 to perform a routing function without adding additional complexity to the customer database 118 or adding additional complexity in the routing system 104 itself.

Figure 3:
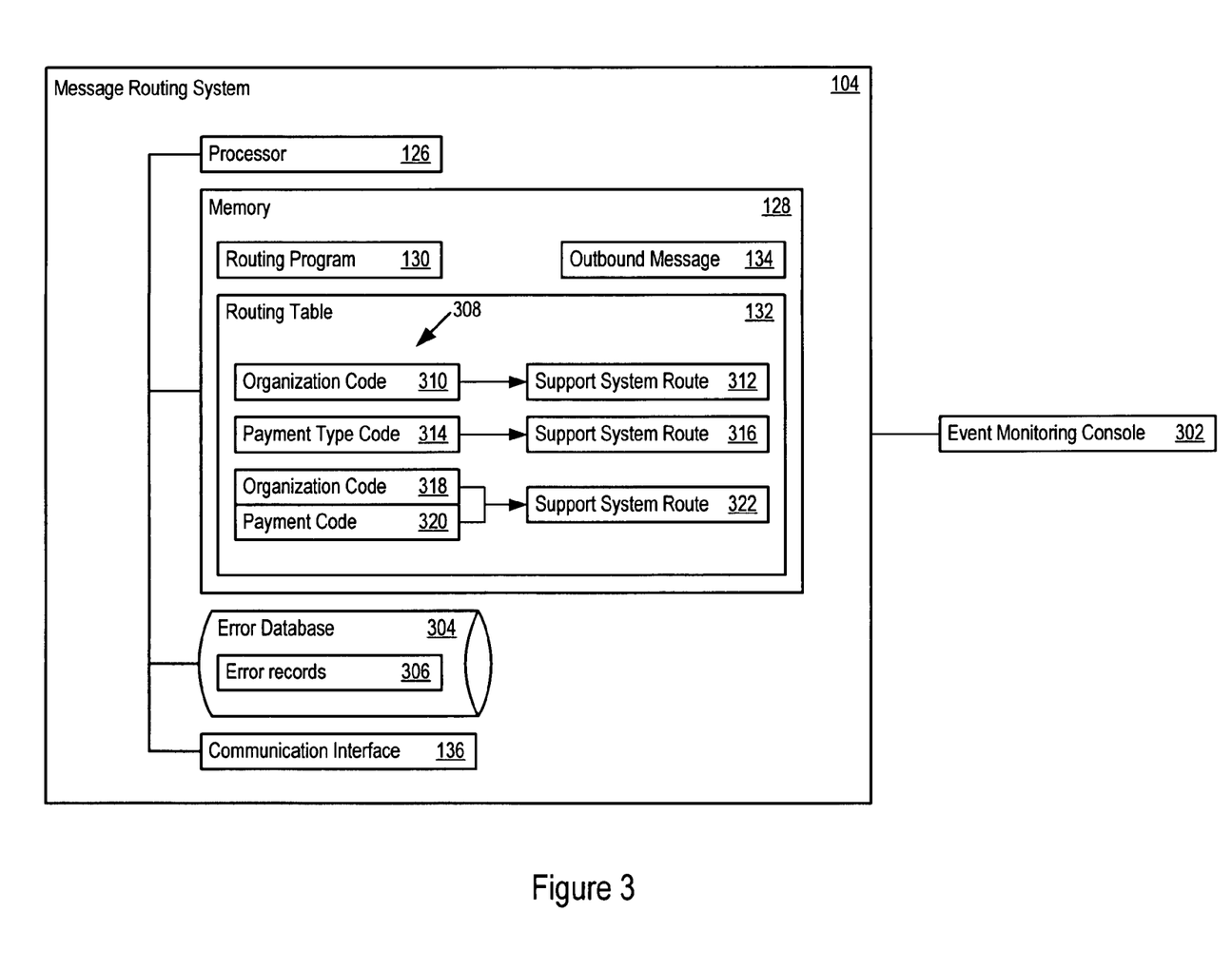
FIG. 3 shows a message routing system that may be used in the telecommunications architecture shown in FIG. 1.

FIG. 3 shows the message routing system 104. The routing system 104 may be connected to an event monitoring console 302. The event monitoring console 302 provides a display and a user-interface through which an operator configures, monitors, and otherwise interacts with the message routing system 104. For example, the event monitoring console 310 may provide operator access into the message routing system error database 304. The error database 304 holds error records 306. The message routing system 104 creates error records when outbound messages cannot be routed or parsed, or when other errors occur in the message routing system 104.

The message routing system memory 128 stores a routing table 132. The routing table 132 defines a mapping 308 of fields from the customer database 118 to the support systems 106. In other words, the routing table 132 leverages the fields already used for another purpose in the customer database 118 for the routing function performed in the message routing system 104. Accordingly, the customer care management system 102 need not define or establish specialized message routing codes which control the destination of the outbound messages 124. Furthermore, message routing system 104 is not limited by a message type defined in the outbound message (e.g., an outbound message marked as a 'Billing' message or created as a 'Billing' action).

In general, a message type by itself may not provide enough information to route the outbound message to the appropriate support system. This is a particularly concern when multiple independent support systems remain operational in the partially merged communications architecture 100. For example, when multiple billing systems remain operational in the architecture 100, the routing system 104 may not be able to ascertain which billing system should receive the outbound message based only on the fact that the outbound message is a 'Billing' message.

Returning to FIG. 3, the mapping 308 associates one or more organization codes 310 with one or more support system route identifiers 312. Alternatively or additionally, the routing table 132 may associate one or more payment type codes 314 with one or more support system route identifiers 316. The support system route identifiers may be network addresses, socket definitions, unique identification codes, identification strings, or any other identifier which specifies a particular support system 106.

Furthermore, the mapping 308 may define a joint mapping in which multiple different codes map to support system route identifiers. The mapping 308 shows one example in which the combination of an organization code 318 and a payment code 320 determine a support system route identifier 322. The message routing system 104 may dynamically reconfigure the routing table 132 during operation to change any of the mapping 308 between database field codes to support systems 106.

Table 1 below shows an example of a mapping between the customer care management system 102 and two separate billing systems identified by IP address and port number. One billing system independently processes wireline customers, while the second billing system independently processes wireless customers.

TABLE 1

| Organization Code | Support System Route |
|---|---|
| 0x0024 | Wireless Billing System: 10.3.2.1:5 |
| 0x0044 | Wireline Billing System: 10.3.2.2:5 |

Table 2 below shows an example of a joint mapping between organization codes and payment codes and four separate billing systems identified by IP address and port number. One billing system independently processes wireline prepaid customers, one billing system independently processes wireless prepaid customers, one billing system independently processes wireline postpaid customers, and the last billing system independently processes wireless postpaid customers.

TABLE 2

| Organization Code, Payment Code | Support System Route |
|---|---|
| 0x0024, 0x0FF | Wireless prepaid Billing System: 10.3.2.1:5 |
| 0x0044, 0x0FF | Wireline prepaid Billing System: 10.3.2.2:5 |
| 0x0024, 0x0AA | Wireless postpaid Billing System: 10.3.2.3:5 |
| 0x0044, 0x0AA | Wireline postpaid Billing System: 10.3.2.4:5 |

As described above, the communications architecture 100 allows the customer care management system 102 to maintain a single database 118 of customer records. As a result the customer care management system 102 may apply consistent set of customer care management rules and procedures across all customers in the customer database despite the origin of the customer records from potentially many independent legacy customer care systems. At the same time, the communication architecture 100 permits the use of multiple independent support systems by efficiently routing the outbound messages 124 to their appropriate destination even though the origin of the outbound messages 124 is a merged customer care management system 102 which handles customers of all types and characteristics.

The outbound messages 124 may be constructed in many different manners. In one implementation, the outbound messages 124 are XML messages which encapsulate customer data, requests for processing actions, message identifiers, and other information in the outbound message. Furthermore, the customer care management system 102 adds the organization, payment code, or other supplemental codes which the message routing system 104 will use to route the outbound messages.

Figure 4:
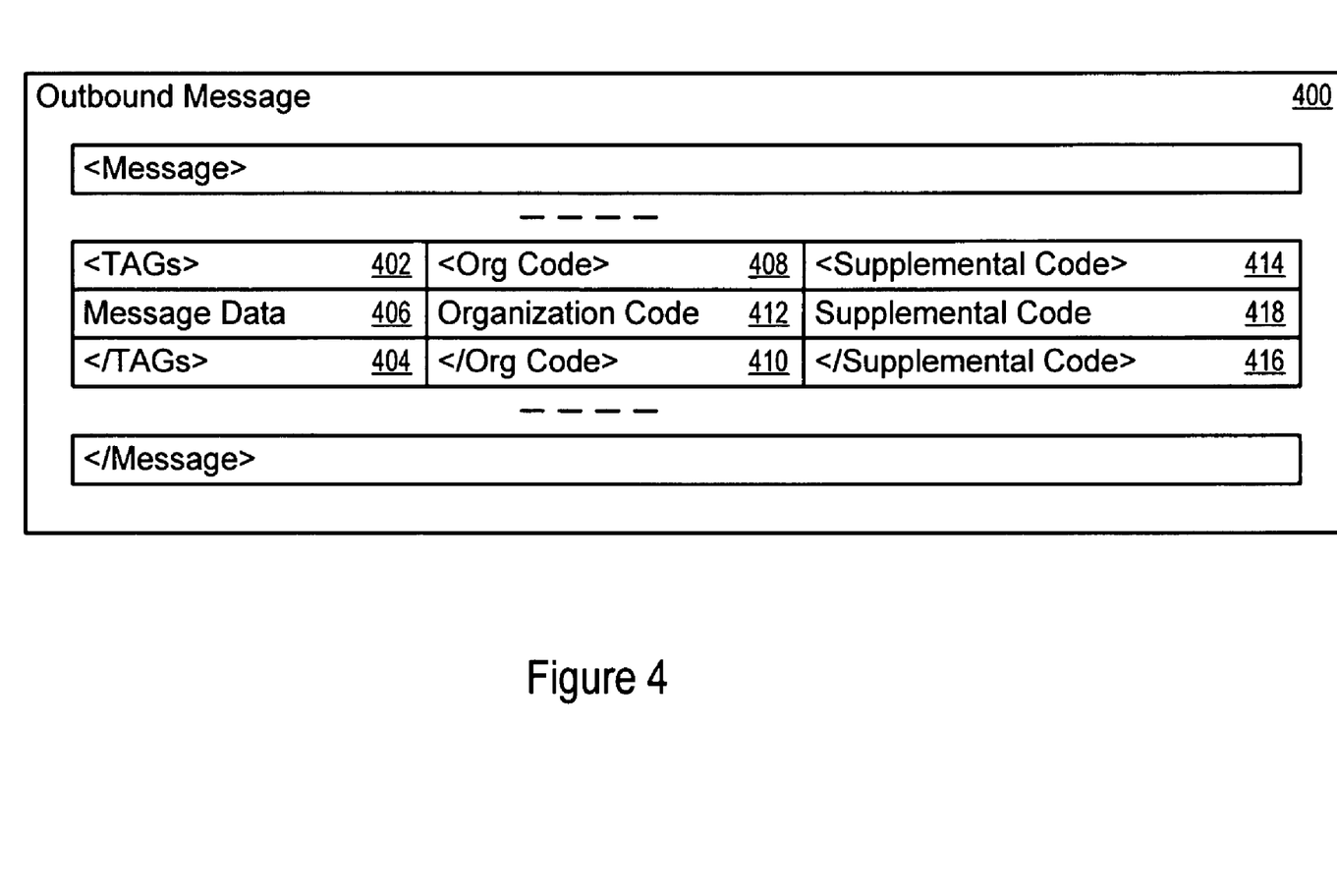
FIG. 4 shows an outbound message for initiating a processing action in a support system.

FIG. 4 shows one example of outbound message 400. The outbound message 400 includes XML begin tags 402 and XML end tags 404 which surround message data 406. As noted above, the message data 406 may specify processing actions, message identifiers, customer data, or any other information desired in the outbound message 400. In addition, the outbound message 400 includes the organization code begin tag 408 and the organization code end tag 410. The organization code tags 408, 410 surround the organization code 412. The outbound message 400 also includes one or more supplemental code begin tags 414 and supplemental code end tags 416. The supplemental tags 414, 416 surround supplemental routing codes 418 (e.g., a payment type code).

While preparing the outbound message 400, the customer care management system 102 adds the organization code tags 408, 410 and the organization code 412 retrieved from the customer record into the outbound message 400. Similarly, customer care management system 102 adds the supplemental code tags 414, 416 in the supplemental code 418 retrieved from the customer record into the outbound message 400. Accordingly, the outbound message 400 includes one or more codes retrieved from the pre-established database structure which will serve a second role in assisting the message routing system 104 to route the outbound message 400 to the appropriate support system 106.

As a more specific example, assume that the customer care management system 102 prepares a billing message for the customer represented by the customer record A 206. The customer care management system 102 builds an outbound message which specifies the billing processing action to be taken for that customer. In addition, the customer care management system 102 adds to the outbound message the organization code stored in the organization field 214 and optionally other supplemental codes, such as a payment code stored in the payment type field 216.

The customer care management system 102 sends the outbound message to the message routing system 104. The message routing system 104 receives the outbound message, and extracts the organization code stored in the message. Based on the organization code (and optionally other supplemental codes extracted from the message), the message routing system 104 determines the appropriate supporting processing system 106. To that end, the message routing system 104 may index the organization code and supplemental codes into the routing table 132 to determine the identity of, or the route to, the supporting processing system.

Figure 5:
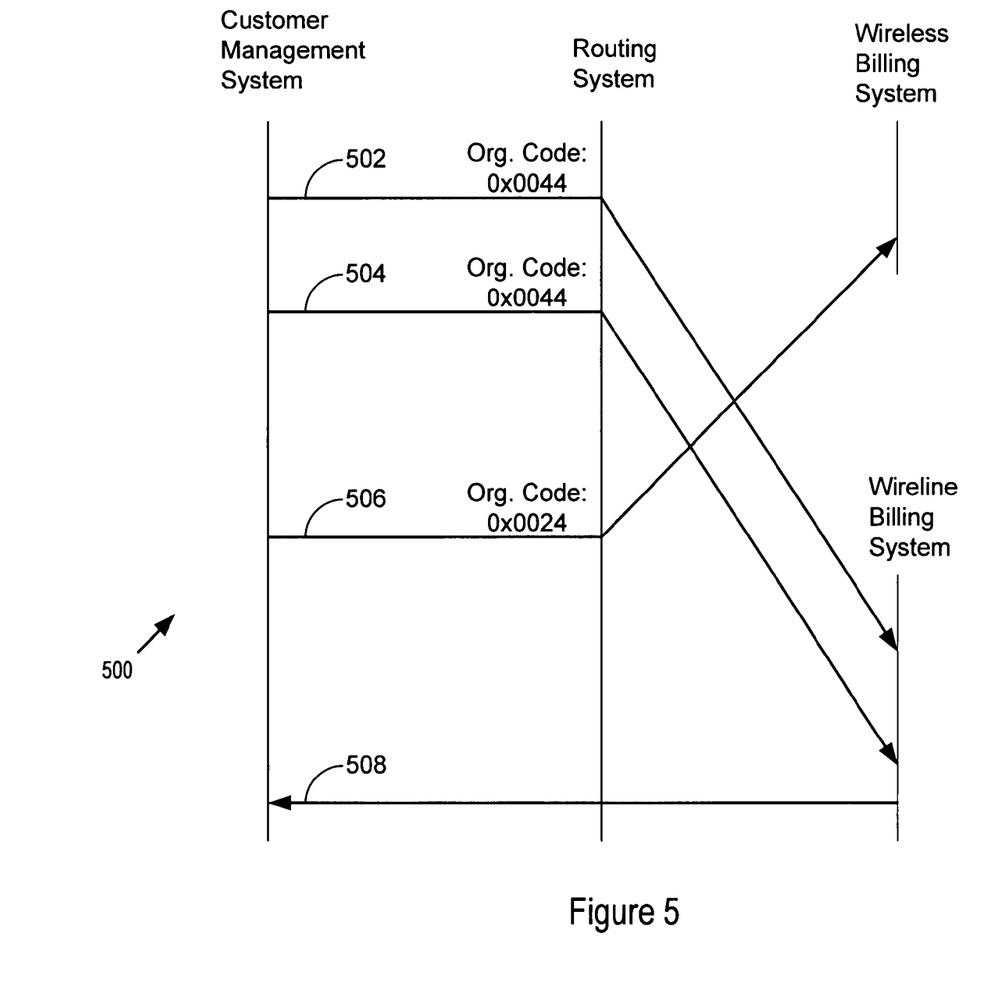
FIG. 5 shows a message flow diagram of messages between the customer care management system, through the routing system, to the support systems.

FIG. 5 summarizes several message flows (generally labeled 500) in the communications architecture 100. The message flows 500 show examples of messages routed to independent billing systems for wireless customers and wireline customers. In the message flow 502, the customer care management system 102 sends an outbound message including the organizational code 0x0044 to the message routing system 104. As described above, the message routing system 104 consults the routing table 132 and forwards the outbound message to the wireline billing system. A similar flow occurs for a subsequent outbound message flow 504. In other words, the message flows 502 and 504 both represent billing messages for wireline customers and the billing messages are routed to the wireline billing system.

FIG. 5 also shows an additional message flow 506. In the message flow 506, the customer care management system 102 sends an outbound billing message including the organization code 0x0024 to the message routing system 104. The routing system 104 extracts the organization code 0x0024, determines that the wireless billing system is the appropriate recipient of the message, and forwards the outbound message to the wireless billing system. In addition, as shown in message flow 508, messages may return from the support systems 106 through the routing system 104 to the customer care management system 102.

Figure 6:
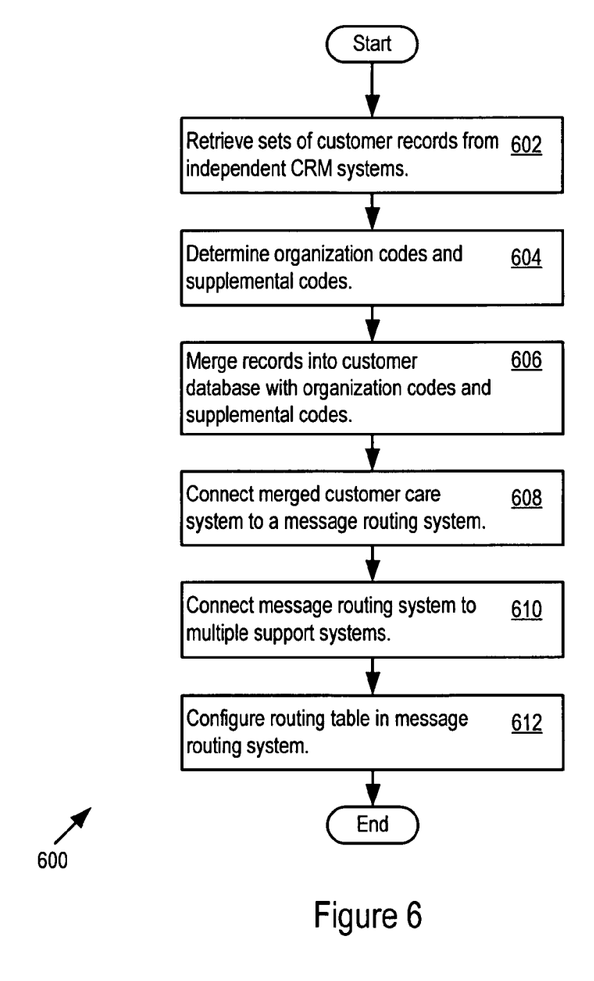
FIG. 6 shows the acts that may be taken to implement a telecommunications messaging architecture.

FIG. 6 shows acts that may be taken to implement a telecommunications messaging architecture. The architecture 100 includes a customer care management system 102. The system 102 may be formed by merging multiple previously independent customer care systems. To that end, sets of customer records from independent customer care systems may be retrieved (Act 602). The architecture 100 may distinguish between the customer records using an organization code (and optionally supplemental codes). Accordingly, the architecture 100 determines the organization codes and supplemental codes for the sets of customer records which will be merged (Act 604).

The customer records are then added into the customer care management system customer database 118 (Act 606). A merged customer care management system 102 results. At this time, the architecture 100 may set the organization code and supplemental codes for each record appropriately. As examples, the architecture 100 may distinguish wireline and wireless customers, prepaid and postpaid customers, business and residential customers or other customer characteristics using selected bit patterns, character fields, or other data for the codes.

It is not necessary that the customer care management system 102 arise from a merger of previous systems. Instead, the system 102 may be a new customer care management system 102 in which the operator establishes customer records from the outset without merging records from previous systems. In this case, the system 102 also adds an organization code (or other codes) to distinguish between the customer records.

The architecture connects the merged customer care management system 102 to the message routing system 104 (Act 608). In addition, the architecture 100 connects the message routing system 104 to multiple support systems 106 (Act 610). The support systems 106 may include one or more billing systems, provisioning systems, service order systems, and/or other types of support systems. The connections between systems may be network connections, interprocess communication connections, or other types of communication connections.

The architecture 100 also configures the routing table 132 in the message routing system 104 (Act 612). The configuration establishes the mapping between the organization code (and optionally supplemental codes) and the appropriate support system 106. The routing system 104 thereby leverages structure already existing in the customer database 118 to route the outbound messages.

Figure 7:
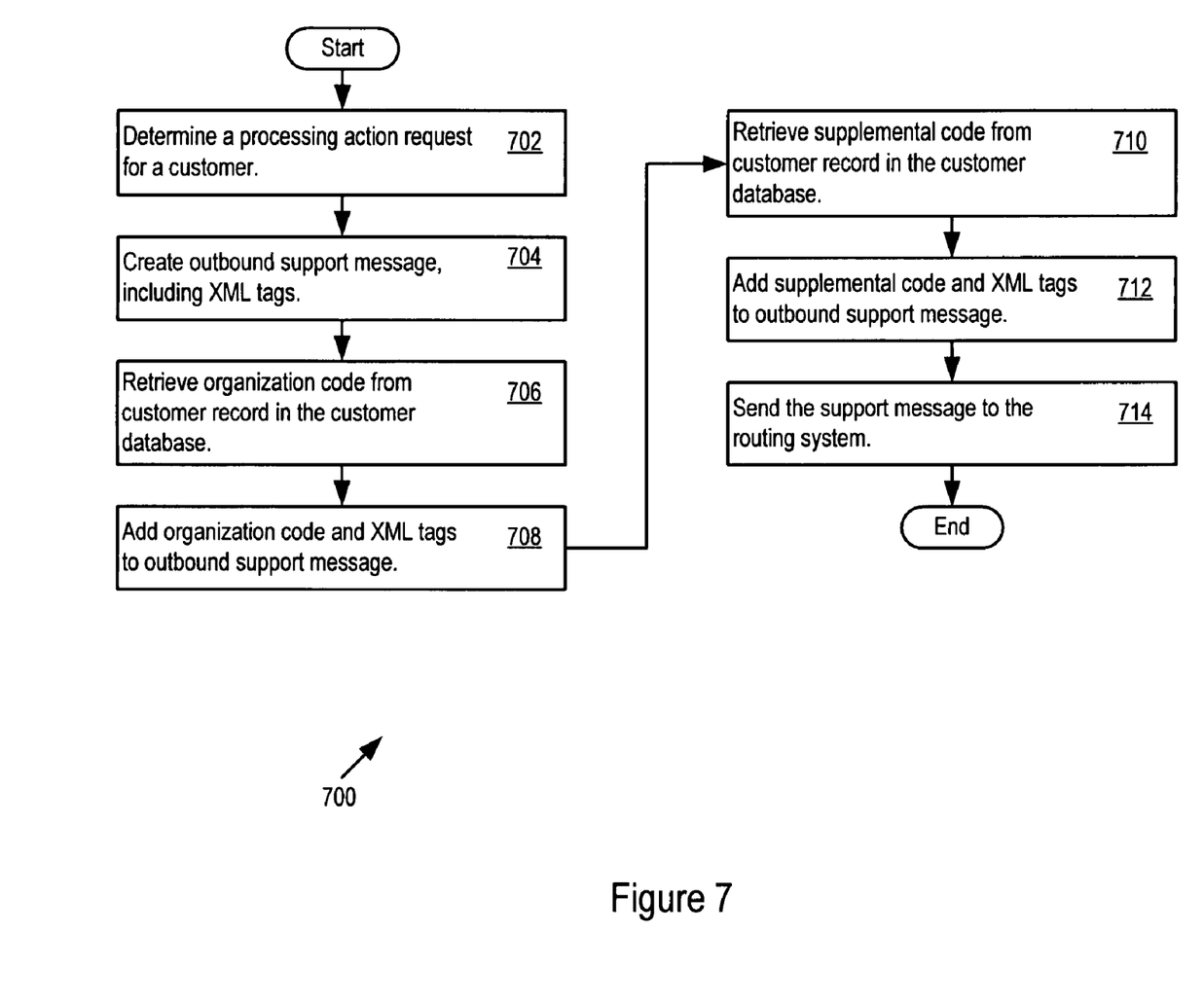
FIG. 7 shows the acts that the customer care management system may take to prepare outbound messages to the support systems.

FIG. 7 shows the acts that the customer care management program 122 may take to prepare outbound messages to the support systems. The customer care management program 122 determines a processing action request to be executed for a given customer (Act 702). The processing action request may be any processing action implemented by the support systems 106. For example, the processing action request may be a billing status inquiry for the customer, the creation of a new customer in the billing system, or any other billing action.

The customer care management program 122 creates an outbound message which requests initiation of the processing action (Act 704). The system 102 may create the message by first retrieving the data content of the messages. The system 102 may then prepare an XML compliant message by adding XML tags which surround the message data. The XML tags may define the requested processing action, the customer identity, and any other customer or processing action characteristics. Other message formats may be employed.

In addition, the customer care management program 122 retrieves the organization code from the customer record in the customer database 118 (Act 706). The customer care management program 122 adds the organization code to the outbound support message (Act 708). The outbound message therefore includes information from the established database structure which will assist routing the outbound message.

Optionally, the customer care management program 122 retrieves additional supplemental codes from pre-defined fields in the customer database 118 (Act 710). The program 122 may then add XML tags for the supplemental codes and include the data and tags in the XML compliant message (Act 712). The customer care management program 122 then sends the outbound message to the message routing system 104 (Act 714).

The organization code and supplemental codes generally are not necessary to define or specify the processing action itself or the customer for whom the processing action is taken. Instead, the organization code and supplemental codes are maintained in the customer database 118 for other purposes, such as to organize the customer records by product or service type, customer type, payment type, or other customer characteristics. However, the routing system 104 leverages these codes for outbound message routing.

Figure 8:
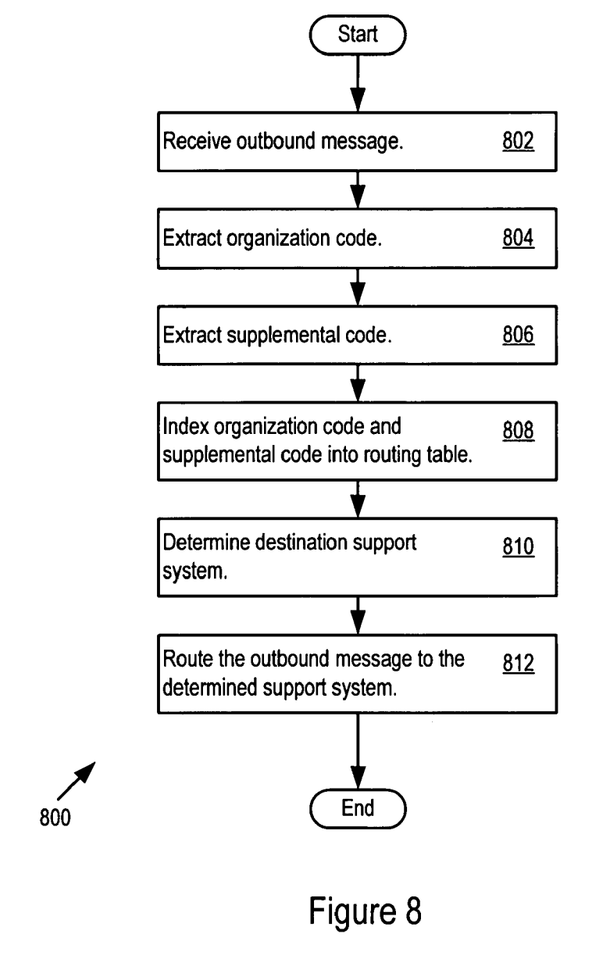
FIG. 8 shows the acts that the routing system may take to route outbound messages to the support systems.

FIG. 8 shows the acts that the routing program 130 in the routing system 104 may take to route outbound messages to the support systems 106. The routing program 130 receives an outbound message (Act 802). From within the outbound message, the routing program 130 extracts an organization code (Act 804) and optional supplemental codes (Act 806).

The routing program 130 consults the routing table 132 (Act 808). The routing table 132 provides the mapping 308 between the organization code and supplemental codes and the appropriate supplemental system 106. In other words, instead of relying only on a message type (e.g. a 'Billing' message type), or a processing action request (e.g., a 'Billing' action), the routing program 130 may consider additional information to determine the appropriate supplemental system 106 for processing the action request (Act 810). Accordingly, the routing system 104 may distinguish between any one of multiple support systems with the same or similar functionality (e.g., multiple billing systems) to handle a given outbound message. Once the routing system 104 identifies the appropriate support system, the routing system 104 forwards the outbound message to the identified support system.

Accordingly, telecommunications service providers may still maintain independent support systems, such as billing systems, while beginning to merge any selected portions of their architectures. Merging customer care systems, for example, may lead to significant savings in cost and time to maintain and operate the customer care portion of a telecommunications architecture. The savings may flow from elimination of multiple customer care software systems, elimination of duplicate customer databases, reduced system complexity, less architectural impact to extend additional products and services to customers, and other duplication between multiple systems.

Furthermore, the merged customer care system, in communication with multiple billing systems, may more readily offer cross-product discounts and incentives. For example, the customer care system may send a billing message to establish a credit to a wireless account or home account based on expenditures on a wireline account or business account. Nevertheless, all of the customer records may be managed in a single merged customer care system.

In addition, an emerging company which does not have the capital to invest in a complete customer care system may benefit from the architecture 100. For example, the emerging company may pay another service provider to store the emerging company's customer data in a merged customer care system with a distinguishing organization code. The message routing system 104 may then route the billing messages for the emerging company to the billing system which handles the customers of the emerging company, in a single architecture which integrates the hosting service provider support systems.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A telecommunications messaging architecture comprising:
    a first support system comprising first support processing logic for a first customer type;
    a second support system comprising second support processing logic for a second customer type;
    a customer care management system comprising:
        a customer database comprising:
            a first customer record for a first customer, the first customer record comprising a first pre-existing organization code in a first organization field; and
            a second customer record comprising a second pre-existing organization code in a second organization field;
            where the first and second pre-existing organization codes represent legacy systems and are obtained from legacy customer records of the legacy systems;
            where the customer database distinguishes the customer records between the first customer type and the second customer type based on the pre-existing organization codes;
        a customer care management program; and
        an outbound support message prepared by the customer care management program for initiating execution of a processing action to be taken for the first customer, where the customer care management program is operable to add the first pre-existing organization code to the outbound support message; and
    a message routing system in communication between the customer care management system and the first and second support systems, the message routing system operable to receive the outbound support message, extract the first pre-existing organization code, and route the outbound support message to one of the first support system and the second support system based on the first pre-existing organization code.

2. The telecommunications messaging architecture of claim 1, where the message routing system comprises a routing table.

3. The telecommunications messaging architecture of claim 2, where the routing table comprises a mapping of pre-existing organization codes to the support systems.

4. The telecommunications messaging architecture of claim 1, where the support systems are billing systems.

5. The telecommunications messaging architecture of claim 1, where the first and second customer records originate from merged customer care systems.

6. The telecommunications messaging architecture of claim 1, where the outbound support message is an XML message which embeds the first pre-existing organization code between XML tags.

7. The telecommunications messaging architecture of claim 1, where the first customer type is a wireline customer type and where the second customer type is a wireless customer type.

8. The telecommunications messaging architecture of claim 1, where:
    the first customer record further comprises a supplemental code stored in a supplemental data field;
    the customer care management program is further operable to add the supplemental code to the outbound support message; and
    the message routing system is further operable to extract the first pre-existing organization code and the supplemental code from the outbound support message, and route the outbound support message to one of the first and second support systems based on both the first pre-existing organization code and the supplemental code.

9. A method for implementing a telecommunications messaging architecture, the method comprising:
    establishing a first support system comprising first support processing logic for a first customer type;
    establishing a second support system comprising second support processing logic for a second customer type;
    establishing a customer care management system comprising a customer database;
    storing multiple customer records in the customer database, each customer record comprising an organization field storing a pre-existing organization code which distinguishes the customer records between the first customer type and the second customer type, where the pre-existing organization codes represent legacy systems and are obtained from legacy customer records of the legacy systems;
    creating an outbound support message for initiating execution of a processing action to be taken for a selected customer;
    retrieving a selected pre-existing organization code assigned to the selected customer from a selected customer record of the multiple customer records in the customer database;
    adding the selected pre-existing organization code to the outbound support message;
    communicating the outbound support message to a message routing system;
    extracting the selected pre-existing organization code at the message routing system; and
    routing the support message to one of the first support system and the second support system based on the selected pre-existing organization code.

10. The method of claim 9, further comprising:
    retrieving a supplemental code from the selected customer record;
    adding the supplemental code to the outbound support message; and
    routing the outbound support message to one of the first and second support systems based on both the selected pre-existing organization code and the supplemental code.

11. The method of claim 9, further comprising:
    accessing a mapping of pre-existing organization codes to support systems to determine where to route the outbound support message.

12. The method of claim 11, where the mapping comprises pre-existing organization codes mapped to the support systems.

13. The method of claim 11, where the mapping comprises pre-existing organization codes in combination with at least one additional customer database field code mapped to the support systems.

14. The method of claim 11, where at least one of the support systems is a billing system.

15. The method of claim 11, further comprising:
retrieving a first set of customer records from a first legacy customer care management system;
retrieving a second set of customer records from a second legacy customer care management system; and
where storing multiple customer records comprises:
merging the first set and second set of customer records into the customer database by populating the organization fields with a pre-existing organization code which varies based on the legacy customer care management system.

16. A method for implementing a telecommunications messaging architecture, the method comprising:
retrieving first customer records from a first legacy customer relationship management system;
determining a first pre-existing organization code to associate with each of the first customer records;
retrieving second customer records from a second legacy customer relationship management system;
determining a second pre-existing organization code to associate with each of the second customer records;
merging the first customer records and the second customer records into a customer database;
setting the first pre-existing organization code for the first customer records represented in the customer database;
setting the second pre-existing organization code for the second customer records represented in the customer database; and
establishing a routing table in a message routing system, the routing table comprises a mapping of the first and second organization codes to different support systems,
where the first and second pre-existing organization codes represent the legacy customer relationship management systems and are obtained from legacy customer records of the legacy customer relationship management systems.

17. The method of claim 16, further comprising:
establishing the customer database in a customer care management system; and
connecting the customer care management system with the message routing system.

18. The method of claim 16, where the different support systems comprise:
a first legacy billing system for handling customers represented by the first customer records; and
a second legacy billing system for handling customers represented by the second customer records.

19. The method of claim 16, further comprising determining a supplemental code which segments the first customer records into a first sub-set and a second sub-set; and setting the supplemental code for the first customer records represented in the customer database.

20. The method of claim 19, where establishing comprises:
establishing a routing table comprising a joint mapping of the first and second pre-existing organization codes and the supplemental codes to different support systems.

* * * * *

UNITED STATES PATENT AND TRADEMARK OFFICE
CERTIFICATE OF CORRECTION

| | | |
|---|---|---|
| PATENT NO. | : 7,804,945 B2 | Page 1 of 1 |
| APPLICATION NO. | : 11/290696 | |
| DATED | : September 28, 2010 | |
| INVENTOR(S) | : Adriano Ottavi | |

It is certified that error appears in the above-identified patent and that said Letters Patent is hereby corrected as shown below:

On the Title Page

Left column, under "Foreign Application Priority Data", insert:
--August 31, 2005    (EPO)    05425612.8--.

In column 8, line 47, after "not be able to" replace "a scertain" with --ascertain--.

Signed and Sealed this
Second Day of October, 2012

David J. Kappos
*Director of the United States Patent and Trademark Office*